United States Patent
Menheere

(10) Patent No.: US 11,674,408 B1
(45) Date of Patent: Jun. 13, 2023

(54) ACTIVELY CONTROLLED BLEED VALVE

(71) Applicant: PRATT & WHITNEY CANADA CORP., Longueuil (CA)

(72) Inventor: David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/659,202

(22) Filed: Apr. 14, 2022

(51) Int. Cl.
*F01D 17/10* (2006.01)
*F16K 31/385* (2006.01)
*F16K 7/17* (2006.01)

(52) U.S. Cl.
CPC ........... *F01D 17/105* (2013.01); *F16K 7/17* (2013.01); *F16K 31/385* (2013.01); *F05D 2260/606* (2013.01)

(58) Field of Classification Search
CPC ........ F01D 17/105; F16K 7/17; F16K 31/385; F05D 2260/606
See application file for complete search history.

(56) References Cited

U.S. PATENT DOCUMENTS

| 4,213,738 A | 7/1980 | Williams |
| 4,296,599 A | 10/1981 | Adamson |
| 5,785,491 A * | 7/1998 | Ozawa .................. F04D 29/106 |
| | | 415/113 |
| 7,258,524 B2 | 8/2007 | Friedel et al. |
| 11,008,979 B2 | 5/2021 | McCaffrey et al. |
| 2008/0023661 A1 * | 1/2008 | Gu ......................... F16K 31/406 |
| | | 251/30.01 |
| 2020/0103046 A1 * | 4/2020 | Romano ............... F16K 31/126 |

* cited by examiner

Primary Examiner — Jacob M Amick
Assistant Examiner — Charles J Brauch
(74) Attorney, Agent, or Firm — Norton Rose Fulbright Canada LLP.

(57) ABSTRACT

A bleed valve has a valve body enclosing a valve chamber defining a passageway between an inlet port and an outlet port. A panel is mounted into the valve body. The panel is deflectable under fluid pressure between a sealing position blocking the passageway when the bleed valve is in a close state, and a bleeding position allowing fluid flow communication between the inlet port and the outlet port when the bleed valve is an open state. A pressure control device is provided to vary a fluid pressure differential between opposite sides of the panel within the valve chamber and selectively open or close the bleed valve.

19 Claims, 3 Drawing Sheets

ACTIVELY CONTROLLED BLEED VALVE

TECHNICAL FIELD

The disclosure relates generally to pressure control systems of turbine engines and, more particularly, to valves for such systems.

BACKGROUND OF THE ART

Bleed valves may be used for various functions in turbine engines, one example of which being the control of compressor operation by opening and closing to regulate flow and control surge and stall characteristics. Existing bleed valves, such as variable bleed valves, include moving parts which may require lubrication and/or wear over time due to friction. For example, moving parts of valves may be in sliding engagement or hingedly connected to open and close the valve. Moving parts may require regular maintenance to ensure adequate function, limit leaks, and/or control their integrity.

SUMMARY

In one aspect, there is provided a bleed valve comprising: a valve body enclosing a valve chamber defining a passageway between an inlet port and an outlet port; a panel mounted into the valve body, the panel deflectable under fluid pressure between a sealing position blocking the passageway when the bleed valve is in a close state, and a bleeding position allowing fluid flow communication between the inlet port and the outlet port when the bleed valve is an open state; and a pressure control device controllable to vary a fluid pressure differential between opposite sides of the panel within the valve chamber and selectively open or close the bleed valve.

In another aspect, there is provided a compressor section of an aircraft engine, comprising: a plurality of compressor stages in serial flow communication; at least one bleed valve fluidly connected to one of the plurality of compressor stages, the at least one bleed valve including: a valve body enclosing a valve chamber defining a passageway between an inlet port and an outlet port, a sheet of metallic material extending across the valve chamber, the sheet of metallic material deflectable under fluid pressure between a sealing position blocking the passageway when the bleed valve is in a close state, and a bleeding position allowing fluid flow communication between the inlet port and the outlet port when the at least one bleed valve is in an open state, and a pressure control device controllable to vary a pressure differential between opposite sides of the sheet of metallic material within the valve chamber and selectively open or close the at least one bleed valve; and a high-pressure air source fluidly connected to the pressure control device.

DESCRIPTION OF THE DRAWINGS

Reference is now made to the accompanying figures in which.

DETAILED DESCRIPTION

Figure 1:
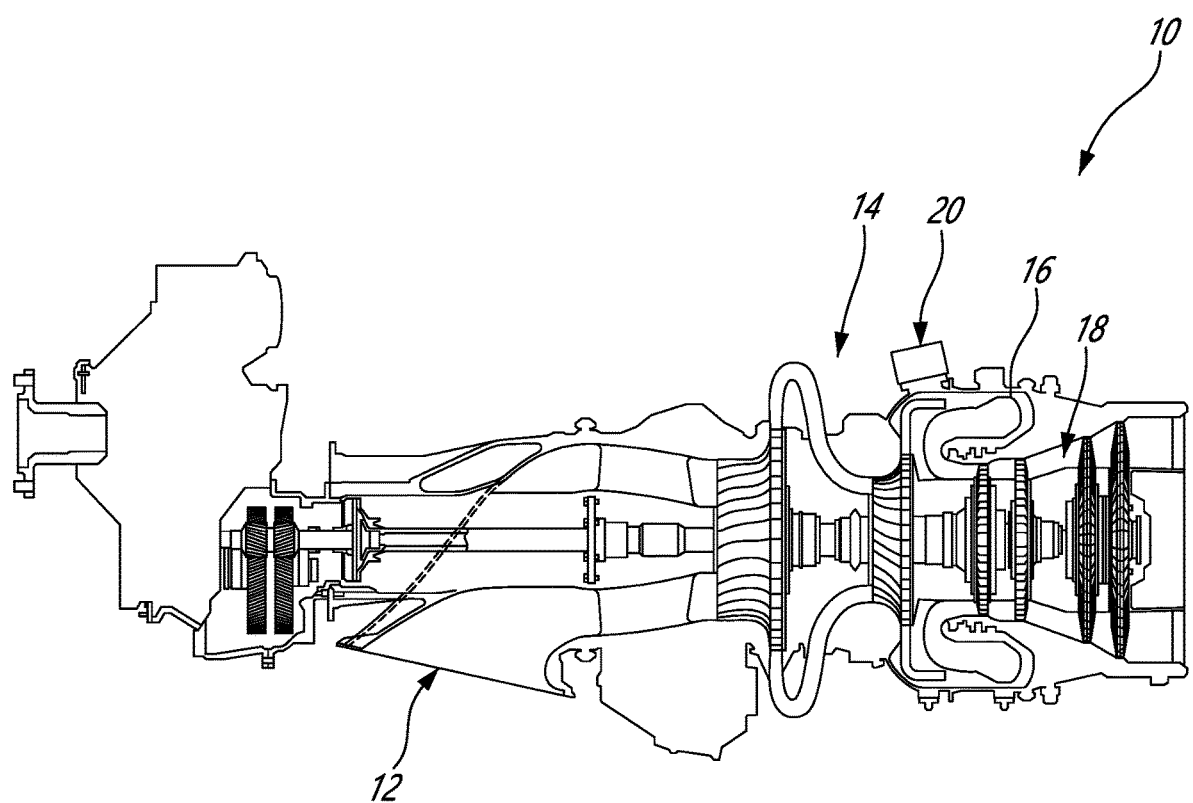
FIG. 1 is a schematic cross section view of an engine having a bleed valve.

FIG. 1 illustrates a turbine engine 10 of a type preferably provided for use in subsonic flight, generally comprising in serial flow communication an air inlet duct 12 through which ambient air is swallowed, a compressor section 14 which has one or more compressor stages including radial or axial compressor rotor(s), in serial flow communication for pressurizing the air, a combustor 16 in which the compressed air is mixed with fuel and ignited for generating an annular stream of hot combustion gases, and a turbine section 18 for extracting energy from the combustion gases. The extracted energy may serve to produce a workload, such as with a propeller, a fan, or else depending on the engine type, in direct (e.g., on a common shaft) or indirect (e.g. via a transmission) driving engagement with the turbine section 18. Schematically shown in the compressor section 14 is a bleed valve 20, which may be part of a pressure control system to regulate flow and control surge and stall characteristics in the compressor section 14. As will be seen herein after, the bleed valve 20 is operable to selectively bleed air from the compressor section 14.

Figure 2:
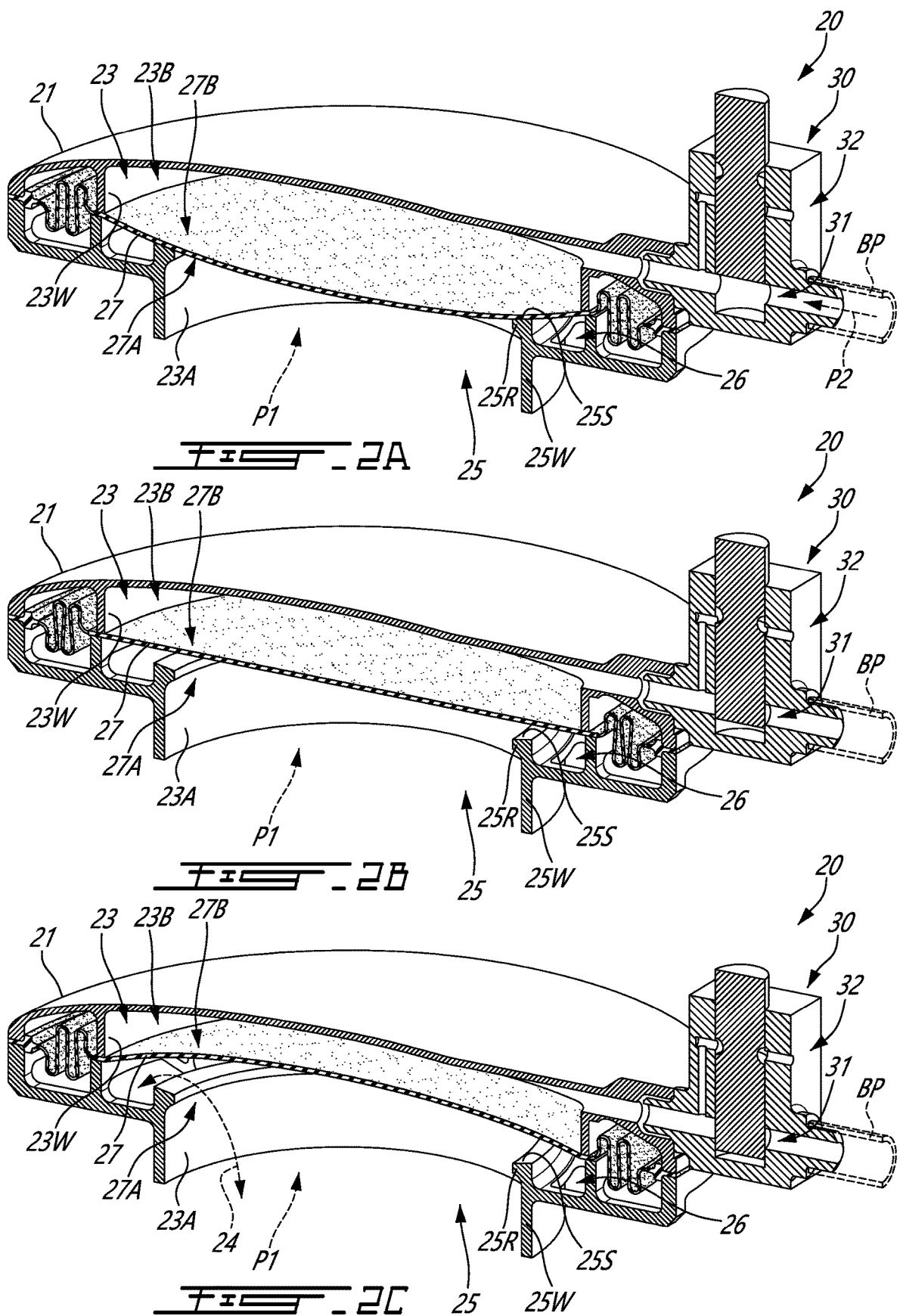
FIG. 2A is a cross sectional perspective view of an exemplary bleed valve of the engine of FIG. 1, in a close state.
FIG. 2B is a cross sectional perspective view of the exemplary bleed valve of FIG. 2A, in an intermediate planar state.
FIG. 2C is a cross sectional perspective view of the exemplary bleed valve of FIG. 2A, in an open state.

Referring to FIGS. 2A-2C, the valve 20 includes a valve body 21 having an upper half portion and a lower half portion enclosing a valve chamber 23 defining a passageway 24 (FIG. 2C) between an inlet port 25 and an outlet port 26. While FIGS. 2A-2C show only one half of the valve 20, it should be understood that the figures are also representative of the other half. The inlet port 25 is upstream of the valve chamber 23, and the outlet port 26 is downstream of the valve chamber 23 relative to a flow of compressor bleed air from the inlet port 25 to the outlet port 26. In the depicted embodiment, the inlet port 25 is defined centrally in the lower half portion of the valve body 21. As shown, the outlet port 26 extends peripherally about the inlet port 25. The inlet port 25 and outlet port 26 may be separated by a common wall, which may be annular and which will be referred to hereinafter. According to the illustrated embodiment, the inlet port 25 includes a single central circular opening and the outlet port 26 includes a circumferential array of openings concentrically distributed around the central circular opening. Other architectures may be contemplated, where the inlet port 25 and outlet port 26 are disposed differently. Furthermore, it is understood that both inlet port 25 and the outlet port 26 may have more than one apertures/openings through which compressed air may flow, hence inlet port 25 and outlet port 26 may define a plurality of flow paths from one or more inlet port apertures to one or more outlet port apertures.

As will be seen hereinafter, the inlet port 25 is in fluid flow communication with the compressor section 14 to receive compressed air therefrom at an input pressure P1. The outlet port 26 (or "bleed port") is in fluid flow communication with the valve chamber 23 when the input pressure P1 exceeds an operating pressure threshold of the compressor section 14. Compressed air may be bled off from the compressor section 14 when such threshold is exceeded to lower/regulate the pressure inside the compressor section 14. Bleed air coming out of the outlet port 26 could be vented to the atmosphere or used as secondary air in a wide variety of applications including: internal cooling of the engine, sealing, crossstarting another engine, engine and airframe anti-icing, cabin pressurization, pneumatic actuators, air-driven motors, etc.

The valve 20 has a fully close state (FIG. 2A) in which the passageway 24 is blocked to restrict air flow and a fully open state (FIG. 2C) to allow fluid flow communication from the inlet port 25 to the outlet port 26.

A valve member embodied in the form of a flexible panel 27 extends across the valve chamber 23. As shown, the exemplified panel 27 may be supported annularly by a peripheral wall 23W of the valve chamber 23. As will be seen hereinafter, the panel 27 is elastically deformable under fluid pressure in sealing engagement with an annular seat or sealing surface 25s to selectively block fluid flow from the inlet port 25 to the outlet port 26. The panel 27 may be provided in the form of a sheet of resilient material. In an embodiment, the sheet of resilient material is a thin sheet of metallic material (e.g., steel, nickel, titanium) adapted to flex under fluid pressure in the order of those prevailing in the compressor section 14 of the engine 10. Other materials with high resistance to heat could be contemplated, to sustain normal operating compression and temperature of the engine 10. Such metal sheet may be a cold rolled metal sheet, for example. Other sheet forming techniques could be contemplated, e.g., hot rolled.

The panel 27 is relatively thin, when compared to other dimensions of the valve 20. Dimensions of the panel 27 may be selected so as to balance flexibility and rigidity. The normal operating conditions of the valve 20, including pressure and heat, may be considered to select the dimensions of the panel 27. In at least some embodiments, the panel 27 has a thickness which may range between 0.02 inches and 0.04 inches (~0.508-1.016 mm). A surface area of the panel 27 may range between 12 inches$^2$ and 16 inches$^2$ (7741 mm$^2$ and 10322 mm$^2$) in at least some embodiments. A ratio of the surface area on which input pressure P1 may apply and the thickness may be between 800:1 and 300:1. In the depicted embodiment, the panel 27 has a disk shape. Other shapes may be contemplated (e.g., elliptical, ovoid, oval). As shown, the panel 27 is generally flat. In addition to being flat, the panel 27 may be seamless. Flatness and/or seamless may promote deflection compared to panels with reinforcements (e.g. ribs, corrugations, waves). A panel 27 with a variable thickness along its surface is contemplated in other variants.

The panel 27 acts as a diaphragm, which may deflect/deform upon application of a fluid pressure. The panel 27 is deflectable so as to move between a sealing position (FIG. 2A) where fluid flow communication is blocked between the inlet port 25 and the outlet port 26, and a bleeding position (FIG. 2C) where fluid communication is allowed. An intermediary position of the panel 27 transitioning between the sealing position and bleeding position is illustrated at FIG. 2B.

In the sealing position (FIG. 2A), the panel 27, on its side 27A facing towards the inlet port 25, is in sealing engagement with a peripheral rim 25R of the inlet port 25. In the depicted embodiment, the peripheral rim 25R is defined by an annular portion of the lower half portion of the valve body 21. As shown, the peripheral rim 25R is defined by an edge of annular wall 25W circumscribing the inlet port 25. The peripheral rim 25R surrounds a section of the passageway 24. The peripheral rim 25R has a valve seat or sealing surface 25S facing towards the panel 27. The sealing surface 25S extends annularly. In the sealing position, the panel 27 is sealing engaged with the sealing surface 25S. The sealing surface 25S may have a shape complementary to that of the panel 27 in its deflected state of the sealing position. As shown in FIG. 2A, the panel 27 as a domed or hemispherical surface in the sealing position. The domed surface of the panel 27 may seat against a correspondingly curved concave sealing surface 25S of the peripheral rim 25R. In an embodiment, for example, the sealing surface 25S may be a spherical segment surface complementary to a spherical cap surface area of the panel 27. Whether or not the sealing surface 25S may have a concave curve, sealing engagement between the panel 27 and the sealing surface 25S may be obtained. A complementary shape of the sealing surface 25S and the panel 27 may, however, provide an even better sealing in some embodiments. In other embodiments, for example, the sealing surface 25S may be at least tangent to the surface of the panel 27 in the sealing position without being curved. For example, the sealing surface 25S may be angled and contact the panel 27 over a surface area along the full periphery of the peripheral rim 25R sufficient to provide adequate sealing, which may be due to a local deformation of the panel 27 mating with the sealing surface 25S. In some cases, the presence of a sealing gasket (e.g., rubber seal, polytetrafluoroethylene ring) on the sealing surface 25S for engagement with the panel 27 in its deflected state of the sealing position may provide an even better sealing and/or reduce fatigue points in the panel 27, which may be due to metal to metal contacts with the sealing surface 25S.

The panel 27 partitions/subdivides the valve chamber 23 into separate zones 23A, 23B. As shown, the zones 23A, 23B are located on opposite sides of the panel 27. At least in some embodiments, the zones 23A, 23B are not fluidly connected. The panel 27 has a first side 27A exposed to the input pressure P1, in zone 23A, and a second side 27B opposite the first side 27A. As shown, the panel 27 has its side 27A facing toward the inlet port 25. In the depicted embodiment, the panel 27 extends in a plane, whether curved (FIGS. 2A, 2C) or straight (FIG. 2B), normal to a centerline of the inlet port 25. The centerline may be straight or curved depending on the shape of the valve 20 and/or configuration of the inlet port 25 with respect to its interface with the connecting interface with the engine 10.

Controlling a pressure differential on opposite side faces of the panel 27 may provide control over the panel deflection. When the input pressure P1 at the inlet port 25 exceeds a fluid pressure on the opposite side of the panel 27, such input pressure P1 may force against the panel 27 in its deflected state of the sealing position, and induce a deflection of the panel 27 from the sealing position to the bleeding position. As the panel 27 distorts, it may "pop-out" of engagement with the sealing surface 25S, passing from the sealing position, where the valve 20 is closed, to the bleeding position, where the valve 20 is opened.

With continued reference to FIGS. 2A-2C, the valve includes a pressure control device 30 in fluid flow communication with the zone 23B of the valve chamber 23. The device 30 is controllable to adjust the fluid pressure in the zone 23B of the valve chamber 23. In the depicted embodiment, the device 30 is mounted to the valve body 21. The device has a passageway 31 fluidly connected to the valve chamber 23. As shown in FIG. 2A, the zone 23B of the valve chamber 23 opposite zone 23A at input pressure P1, is in fluid flow communication with the passageway 31. In this way, the device 30 may control the pressure differential between the input pressure P1 on one side of the panel 27, in zone 23A, and the fluid pressure, which may be referred to as control pressure P2, on the opposite side of the panel 27, in zone 23B. The control pressure P2 may oppose, at least partially, to the deflection of the panel 27 towards the bleeding position until the input pressure P1 exceeds it. Reducing the control pressure P2 may cause the panel 27 to distort and "pop" into the bleeding position. Increasing the control pressure P2 may cause the panel 27 to "pop" into the sealing position if the control pressure P2 is sufficient to counterbalance the input pressure P1. Compressed air at control pressure P2 may be supplied to the zone 23B of the valve chamber 23 from a pipe BP originating from another portion of the engine, at an operating pressure greater than the pressure at the inlet port 25. For example, such portion may be a stage of the compressor section 14 which has a greater pressure than input pressure P1. Such stage may correspond to a compressor stage downstream of the source of compressed air at input pressure P1 entering the valve 20. This is only one possibility, as the control pressure P2 could be obtained by a source external to the engine 10.

In an embodiment, the device 30 includes a solenoid valve 32. The solenoid valve 32 may be selectively activated to allow the feeding of the compressed air at control pressure P2 into the valve chamber 23, and to block access to the compressed air at control pressure P2 into the valve chamber 23. Activation of the solenoid valve 32 may be controlled electronically, for example, based on an operating pressure limit of the compressor section 14 or one of the compressor stages, or other engine parameters. Such active control of the pressure differential in the valve 20 may allow control over the operation of the compressor section 14, e.g., to regulate flow and control surge and stall. Other devices to actively control the pressure differential in the valve 20 may be contemplated.

Figure 3:
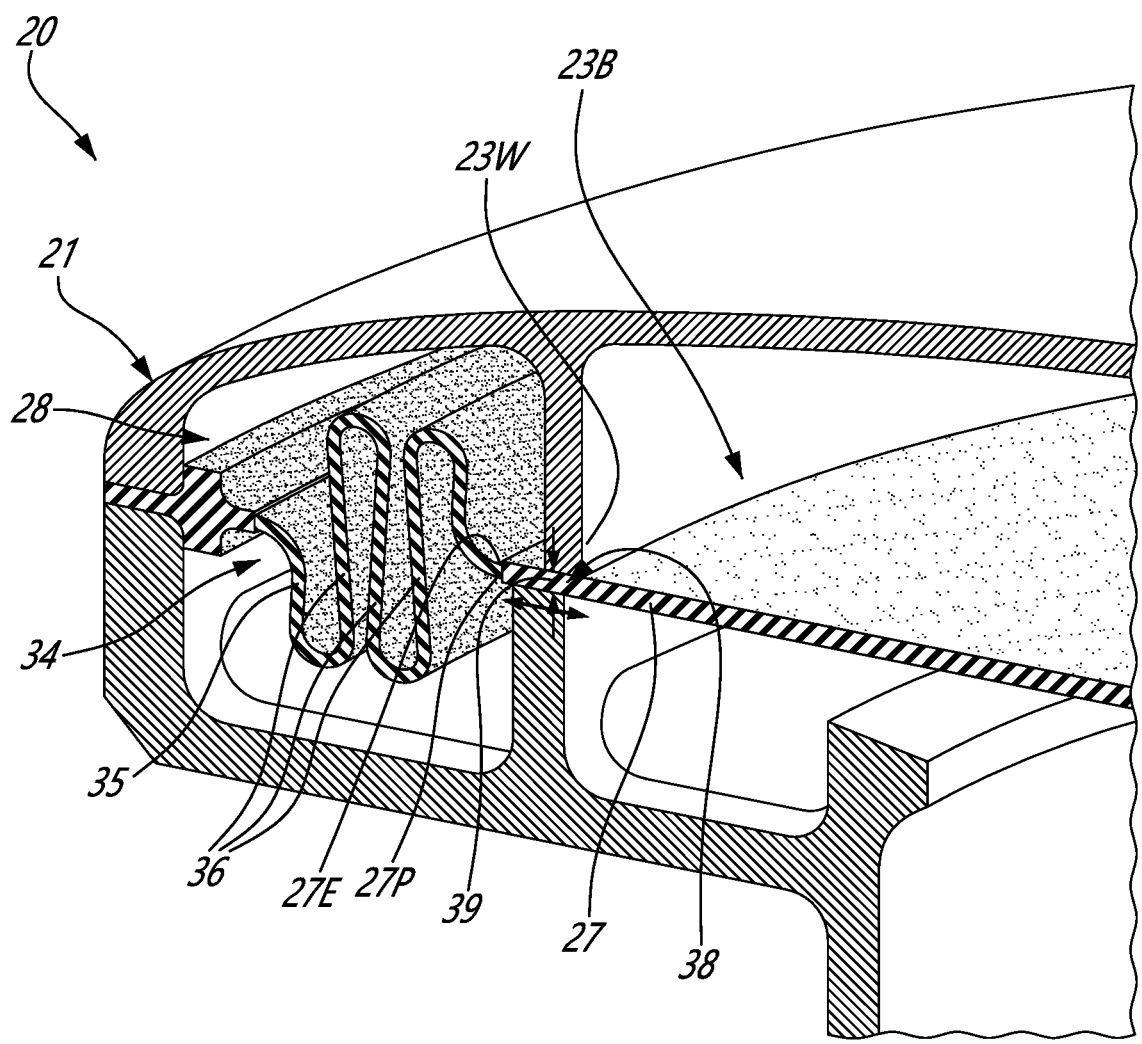
FIG. 3 is a magnified perspective view of a portion of the bleed valve of FIGS. 2A-2C.

In at least some embodiments, a compression load is applied at a periphery 27P of the panel 27. Referring to FIG. 3, a biasing member 34 may apply a load on the panel 27 so as to force the deflection of the panel 27 in the sealing and/or bleeding position. By pressing at the periphery 27P of the panel 27, the panel 27 may deflect towards the sealing or the bleeding position. As such, even without pressure differential on opposite sides of the panel 27, the panel 27 may be biased in a deflected state. In other words, the biasing member 34 may exert a compressive load at the periphery 27P of the panel 27 to force it into a dome shape away from a planar shape (FIG. 2B).

In the depicted embodiment, the biasing member 34 includes a corrugated ring 35. The corrugated ring 35 includes a plurality of folds 36 disposed in a serial manner with respect to each other. The folds 36 define alternating lobes and valleys extending in a transverse direction with respect to the surface area of the panel 27. The corrugated ring 35 may deform/deflect as the panel 27 expands and/or is constrained to deflect between its sealing position and bleeding position. As shown, the corrugated ring 35 may contact a peripheral edge 27E of the panel 27. The corrugated ring 35 may be coupled to the peripheral edge 27E of the panel 27 and to the valve body 21. In the depicted embodiment, the corrugated ring 35 is not enclosed within the valve chamber 23. As shown, the corrugated ring 35 is enclosed in a separate enclosure 28 defined by the valve body 21. As shown, the enclosure 28 extends about the valve chamber 23. The corrugated ring 35 could be within the valve chamber 23 in other embodiments. The corrugated ring 35 could form part of the panel 27, as an integral part thereof, in some embodiments. The corrugated ring 35 is given as an example. Other biasing member 34 may maintain a compression load on the panel 27. The biasing member 34 may provide compliance, compared to a rigid connection of the panel 27 on the valve body 21. Because of such compression load, in order to bleed air from the valve 20, the input pressure P1 on the first side of the panel 27 may have to exceed the control pressure P2 and force against the compression load of the biasing member 34 to "pop" the panel 27 out from the sealing position.

With continued reference to FIG. 3, a sliding interface 38 is defined at a junction between the panel 27 and the peripheral wall 23W of the valve chamber 23. As shown, the panel 27 is supported annularly by the peripheral wall 23W between the upper and lower half portions of the valve body 23, at the sliding interface 38. The sliding interface 38 may not be air-tight. Compressed air leaking from zone 23B at control pressure P2 may be trapped in the enclosure 28, between the valve body 21 and the corrugated ring 35, as this part of the enclosure 28 may be sealed. The sliding interface 38 may guide the panel 27 as it expands and contracts during a transition from the sealing position to the bleeding position (or vice versa). The sliding interface 38 may be defined in a gap 39 between sections of the peripheral wall 23W, as shown. The gap 39 may extend along the full periphery of the valve chamber 23 in the plane of the sliding interface 38. The sliding interface 38 may allow more freedom of movement to the panel 27, compared to a rigid connection between the peripheral wall 23W and the panel 27, for example. More freedom of movement, such as with the sliding interface 38, may limit stress fatigue in the sheet material of the panel 27. Other panel support may be contemplated, without the sliding interface 38. Rigid connection between the panel 27 and the peripheral wall 23W, as an integral part thereof, for example, is not excluded in some variants.

Assembly of the valve 20 described herein may require assembling a plurality of parts forming the valve body 21 (e.g., two parts, as shown), with the panel 27 and corrugated ring 35 inserted in between them before welding, fastening or otherwise coupling the valve body parts together. The device 30 (e.g., solenoid valve 32) may then be mounted to the valve body 21, and connected to the high-pressure source with suitable pipes. Controls of the device 30 may then be implemented by a suitable type of controller of the engine 10.

In some embodiments, the valve 20 could be used in a valve assembly comprising a plurality of valves 20 to mimic the function of a variable bleed valve. Each valve of such assembly could, for example, be adapted to open at a different pressure threshold, bleed air at various rates and/or be actively controlled, independently, to open and close at a desired moment.

While the valve 20 is described in the context of a compressor section of a turbine engine, such as compressor section 14 of the engine 10, the valve 20 may be located in other areas of an aircraft engine to bleed air therefrom.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the valve 20 could be used with other fluids than compressed air or gas, for example liquids. Yet further modifications could be implemented by a person of ordinary skill in the art in view of the present disclosure, which modifications would be within the scope of the present technology.

The invention claimed is:

1. A bleed valve comprising:
   a valve body enclosing a valve chamber defining a passageway between an inlet port and an outlet port;

a panel mounted into the valve body, the panel deflectable under fluid pressure between a sealing position blocking the passageway when the bleed valve is in a close state, and a bleeding position allowing fluid communication between the inlet port and the outlet port when the bleed valve is an open state; and a pressure control device controllable to vary a fluid pressure differential between opposite sides of the panel within the valve chamber and selectively open or close the bleed valve, wherein the pressure control device includes a solenoid valve having a passageway in fluid flow communication with the valve chamber.

2. The bleed valve as defined in claim 1, wherein the valve chamber has a peripheral wall, the panel supported annularly by the peripheral wall.

3. The bleed valve as defined in claim 1, wherein the panel includes a sheet of resilient material, and wherein the sheet of resilient material has a dome shape at least in the sealing position.

4. The bleed valve as defined in claim 1, wherein the panel partitions the valve chamber into separate zones on the opposite sides of the panel, a first one of the separate zones in fluid flow communication with the inlet port, a second one of the separate zones in fluid flow communication with the pressure control device.

5. The bleed valve as defined in claim 1, wherein the panel extends in a plane normal to a centerline of the inlet port.

6. The bleed valve as defined in claim 1, wherein the valve body has a peripheral rim, the peripheral rim surrounding a section of the passageway, the peripheral rim having a sealing surface facing towards the panel, the panel sealingly engageable with the sealing surface.

7. The bleed valve as defined in claim 6, wherein the sealing surface extends annularly, the sealing surface having a shape complementary to that of the panel in the sealing position.

8. The bleed valve as defined in claim 7, wherein the panel has a domed surface in the sealing position, the sealing surface has a correspondingly curved concave shape, the domed surface of the panel seating against the sealing surface in the sealing position.

9. The bleed valve as defined in claim 1, wherein the panel is flat and has a disk shape.

10. The bleed valve as defined in claim 1, wherein the panel has a thickness between 0.02 inches and 0.04 inches (±0.01 inches).

11. The bleed valve as defined in claim 10, wherein a ratio of a surface area of the panel over the thickness of the panel is between 800:1 and 300:1.

12. The bleed valve as defined in claim 3, wherein the sheet of resilient material is a metal sheet including at least one of steel, nickel or titanium.

13. The bleed valve as defined in claim 1, further comprising a biasing member extending about a periphery of the panel, the biasing member biasing the panel in a deflected state to force the panel into a dome shape.

14. The bleed valve as defined in claim 13, wherein the biasing member is coupled to the valve body and a peripheral edge of the panel.

15. The bleed valve as defined in claim 13, wherein the biasing member includes a corrugated ring having a plurality of folds disposed in a serial manner with respect to each other.

16. The bleed valve as defined in claim 2, wherein a sliding interface is defined at a junction between the panel and the peripheral wall, the sliding interface guiding the panel as it expands and contracts during a transition between the sealing position and the bleeding position, the sliding interface defined in a gap between sections of the peripheral wall, the gap extending along a full periphery of the valve chamber in a plane of the sliding interface.

17. A compressor section of an aircraft engine, comprising:

a plurality of compressor stages in serial flow communication;

at least one bleed valve fluidly connected to one of the plurality of compressor stages, the at least one bleed valve including:
a valve body enclosing a valve chamber defining a passageway between an inlet port and an outlet port,
a sheet of metallic material extending across the valve chamber, the sheet of metallic material deflectable under fluid pressure between a sealing position blocking the passageway when the bleed valve is in a close state, and a bleeding position allowing fluid flow communication between the inlet port and the outlet port when the at least one bleed valve is in an open state, and
a pressure control device controllable to vary a pressure differential between opposite sides of the sheet of metallic material within the valve chamber and selectively open or close the at least one bleed valve; and a high-pressure air source fluidly connected to the pressure control device, wherein the high-pressure air source is fluidly connected to the pressure control device by a pipe originating from a portion of the aircraft engine at an operating pressure greater than that at the inlet port.

18. The compressor section as defined in claim 17, wherein the sheet of metallic material subdivides the valve chamber into separate zones on the opposite sides of the sheet of metallic material, a first one of the separate zones in fluid flow communication with the inlet port, a second one of the separate zones in fluid flow communication with the pressure control device.

19. A compressor section of an aircraft engine, comprising:

a plurality of compressor stages in serial flow communication;

at least one bleed valve including:
a valve body enclosing a valve chamber defining a passageway between an inlet port and an outlet port,
a sheet of metallic material extending across the valve chamber, the sheet of metallic material deflectable under fluid pressure between a sealing position blocking the passageway when the bleed valve is in a close state, and a bleeding position allowing fluid flow communication between the inlet port and the outlet port when the at least one bleed valve is in an open state, and
a pressure control device controllable to vary a pressure differential between opposite sides of the sheet of metallic material within the valve chamber and selectively open or close the at least one bleed valve; and a high-pressure air source fluidly connected to the pressure control device;

wherein the sheet of metallic material subdivides the valve chamber into separate zones on the opposite sides of the sheet of metallic material, a first one of the separate zones in fluid flow communication with the inlet port, a second one of the separate zones in fluid flow communication with the pressure control device.

\* \* \* \* \*